(12) United States Patent  
Hill

(10) Patent No.: US 6,416,676 B1
(45) Date of Patent: Jul. 9, 2002

(54) DEIONIZED WATER DEGASIFICATION FOR SEMICONDUCTOR FABRICATION

(75) Inventor: Rodney L. Hill, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 1175 days.

(21) Appl. No.: 08/669,794

(22) Filed: Jun. 27, 1996

Related U.S. Application Data

(63) Continuation of application No. 08/450,244, filed on May 24, 1995, now abandoned.

(51) Int. Cl.⁷ .......................... B01D 15/04; B01D 53/22
(52) U.S. Cl. ...................... 210/900; 210/180; 210/660; 210/664; 95/43; 95/46; 134/1.3
(58) Field of Search .................. 210/900, 180, 210/660, 664; 95/43, 8, 46; 438/225, 229; 156/659.1; 134/1.3

(56) References Cited

U.S. PATENT DOCUMENTS

| 3,870,033 A | 3/1975 | Faylor et al. ............... 210/900 |
|---|---|---|
| 4,595,498 A | 6/1986 | Cohen et al. ............... 210/192 |
| 4,659,460 A | 4/1987 | Muller et al. ............... 210/93 |
| 4,698,153 A | 10/1987 | Matsuzaki et al. .......... 210/192 |
| 4,917,122 A * | 4/1990 | Lapham et al. ............... 134/3 |
| 4,990,260 A | 2/1991 | Pisani ......................... 210/664 |
| 5,024,766 A | 6/1991 | Mahmud ..................... 210/668 |
| 5,032,265 A | 7/1991 | Jha et al. .................. 210/195.2 |
| 5,124,033 A | 6/1992 | Ohmi et al. ................. 210/181 |
| 5,128,041 A | 7/1992 | Degen et al. ............... 210/638 |
| 5,156,739 A | 10/1992 | Dawson et al. ........... 210/321.8 |
| 5,175,124 A * | 12/1992 | Winebarger .................. 437/225 |
| 5,227,053 A | 7/1993 | Brym ......................... 210/143 |
| 5,242,468 A | 9/1993 | Clark et al. ................. 29/25.01 |
| 5,246,586 A | 9/1993 | Ban et al. .................... 210/638 |
| 5,336,371 A * | 8/1994 | Chung et al. ............... 437/229 |
| 5,422,013 A | 6/1995 | Hirofuji ..................... 210/739 |
| 5,447,640 A | 9/1995 | Omi et al. ................... 210/748 |
| 5,544,776 A * | 8/1996 | Okuda et al. ............... 437/229 |

OTHER PUBLICATIONS

Operating Manual, Liqui–Cel® Membrane Contactors, Hoechst Celanese Corporation, 1993.
Liqui–Cel® Contactors, "The Best Path to Greater Gas Transfer Efficiencies", Hoechst Celanese Corporation, 1993.

* cited by examiner

*Primary Examiner*—Ana Fortuna
(74) *Attorney, Agent, or Firm*—Skjerven Morrill MacPherson LLP; Norman R. Elivans

(57) ABSTRACT

In microelectronics (semiconductor) processing, pitting and voiding of aluminum and aluminum alloys by deionized (DI) water is prevented. The present method and apparatus degasifies the DI water to remove the dissolved oxygen gas. The oxygen gas concentration of the DI water is thus reduced from the saturation levels typically present to vastly less than saturation. It has been found that oxygen gas serves as the oxidizing agent in an electro-chemical reaction that includes the aluminum metal as the anode. The degasified DI water can be used at high temperatures and for long exposure times to rinse wafers without problematic aluminum etching. The present method is applicable to any semiconductor wafer fabrication or integrated circuit assembly process that uses DI water in contact with aluminum metallization.

6 Claims, 1 Drawing Sheet

DEIONIZED WATER DEGASIFICATION FOR SEMICONDUCTOR FABRICATION

CROSS REFERENCE TO RELATED APPLICATION

This application is a continuation application of U.S. patent application Ser. No. 08/450,244, filed May 24, 1995 now abandoned.

BACKGROUND OF THE INVENTION

1. Field of the Invention

This invention relates generally to production of high purity deionized water and more specifically to the enhancement of deionized water by degasification at the point of use.

2. Description of the Prior Art

The requirement for high purity water with particular properties has evolved in several industries. The water purity requirements of the semiconductor industry are among the most demanding of any industry. While the yield of semiconductor chips is dependent upon a variety of factors, the average chip yield is directly related to the purity of deionized process water. As the size of the geometry used on the chips decreases, the adverse effects on yield of impurities in deionized (DI) process water increase. The requirement for high purity water in semiconductor processing is widely recognized. See for instance, U.S. Pat. No. 5,024,766 issued Jun. 18, 1991 to Shahzad Mahmud, incorporated herein by reference. See also U.S. Pat. No. 4,659,460 issued Apr. 21, 1987 to Muller et al., and U.S. Pat. No. 5,242,468 issued Sep. 7, 1993 to Clark et al. These other patent disclosures deal with various processes and apparatuses for purifying water.

For instance, U.S. Pat. No. 5,024,766 describes purifying DI water by lowering the total organic contaminant level of purified water from a plant purification system using an organic contaminant removal unit at the point of use. This describes further purification of water from a prior art plant water purification system, wherein the water purification unit is a small compact unit inserted between the water line from the purified deionized water line in the plant water purification system and the inlet of the point of use apparatus. The emphasis is on reducing organic contaminants.

U.S. Pat. No. 4,659,460 discloses a mobile fluid purification unit using demineralizers.

U.S. Pat. No. 5,242,468 is directed to ultra-high purity liquids for purposes of semiconductor fabrication. This is not limited to water but is also directed also to other liquids used in such fabrication. The treatment is performed at the point of use. The description of water filtration is directed to well known methods such as ion exchange and reverse osmosis in order to kill organisms, remove particles and organic matter and further removal of ions and sterilization.

As is well known, deionized water is used extensively in a typical semiconductor manufacturing processes. There are in typical semiconductor processes 100 to 200 steps in which DI water is applied to semiconductor wafers. DI water is applied to the wafers in 25 to 50 steps of such processes typically where an aluminum alloy (metallization) is present on the wafers. Deionized water is used in the wafer fabrication and assembly processes because of the low level of contaminants present. As is well known and as described in the prior art, contaminants in "tap" water such as sodium, potassium, nitrates, organics, bacteria, and others contribute to the failure of microelectronic devices. A measure of the quality of DI water is resistivity. The higher the resistivity, the lower the level of the ionic contaminants and the higher the quality. As integrated circuit dimensions continue to be reduced, greater demands are placed on the purity of DI water. The response of the semiconductor industry is to continue to drive up the requirements for the resistivity of DI water i.e., its purity. For instance, an American Society for Testing Materials (ASTM) requirement for electronic grade type E-1 (point of use ultra-pure water) in U.S. Pat. No. 5,024,766 is a resistivity of 18 megaohms-cm. This was in 1988. Current semiconductor fabrication techniques require greater purity in terms of e.g. particle filtration, and reduction in dissolved silica.

Thus a common practice in DI water manufacturing is the injection of air into the deionized water to remove carbon dioxide which is a contaminant from the reverse osmosis step. This saturates the deionized water with oxygen to a typical oxygen concentration of 8,500 ppb (parts for billion) at 25° C. Such oxygen has typically not been considered a contaminant or particularly problematic in the prior art.

However, it is also well known that DI water in the prior art etches aluminum and aluminum alloys (the metallization on semiconductor wafers), creating undesirable pits and voids in the metal leading to device failures, thereby reducing yield and/or reduction in long term reliability of the fabricated circuits.

Thus semiconductor manufacturers are forced to go to great lengths (automation, dry-to-dry processing, critical queue times and other techniques) to ensure that semiconductor wafers with metallization (aluminum) on them do not remain in contact with DI water for extended times. It is also recognized that the etch rate of aluminum is undesirably accelerated by increasing the temperature of the DI water. It is known also that it is desirable to use high temperature DI process water because of its improved solvating efficiency. Thus in the prior art use of high temperature DI water is precluded by the increased undesirable aluminum etch rate.

Therefore, it is generally recognized that there are problems in the use of DI water and especially high temperature DI water during semiconductor processing steps where aluminum or aluminum alloys are present on the wafers. However, it is not believed that any prior art solutions have been proposed.

SUMMARY

The present inventor has recognized that the problematic reaction between DI water and aluminum alloys is not due to the water itself but to the dissolved oxygen present in the DI water. It is not believed that the exact nature of the drawbacks of DI water were recognized in the prior art; instead, DI water in general was believed to be problematic when in contact with aluminum and aluminum alloys. This prior art conclusion was erroneous as determined by the present inventor.

The present inventor instead has found that DI water is problematic when used in contact with aluminum or aluminum alloys only due to the oxygen dissolved in DI water, due to the prior step of injection of air to remove the undesirable carbon dioxide or due to other sources of air or oxygen coming into contact with the DI water. The supplied deionized water has a concentration of dissolved oxygen gas exceeding 3000 ppb. Therefore, the present inventor has found that degasification of DI water immediately before it reaches the metallized wafers overcomes the problems with aluminum processing. The degasification process removes the dissolved oxygen which has been identified by the present inventor as the oxidizing agent that leads to the undesirable etching or pitting of the aluminum. Thus it has been found by the present inventor that DI water without oxygen does not etch aluminum or aluminum alloys. No pits or voids are produced in the aluminum portions of a semiconductor wafer that has been rinsed with degasified DI water.

Removing the dissolved oxygen thus allows the use of higher temperature DI water on metallized wafers and longer rinsed times. This increases yield and improves circuit reliability. The degasification also eliminates the inconvenience of necessarily removing the wafers immediately from e.g., a DI rinse tank after a rinse cycle is complete. This offers increased flexibility in semiconductor processing by relaxing one critical process parameter.

While the presently disclosed embodiment is in the context of semiconductor processing, this is illustrative and not limiting.

DETAILED DESCRIPTION

In accordance with the invention, the so-called "plant" DI water supply is provided conventionally via pipes, having the high level of dissolved oxygen gas therein, to a point of use degasifier unit which is connected to or located on a particular semiconductor processing tool using the deionized water. Typically, the plant deionized water has a concentration of 8,500 ppb of oxygen gas. The degasifier unit substantially reduces this, to for instance 100 ppb or less and ideally to below 25 ppb by the use of several degasifier units in series. A level of 25 ppb or less is needed for most semiconductor processes. Examples (not limiting) of tools using deionized water include cascade rinsers, quick dump rinsers, spin rinse dryers, develop track rinse modules, metal etcher rinse modules, wafer dicing and sawing equipment, and wafer back lappers. The degasifier unit may be attached directly to the plant DI water system and be a part thereof at the point of use or may be located physically on the tool. The exact location of the degasified unit is not critical although, of course, the closer it is to the actual point of use the less chance of additional oxygen reentering the water after it is degasified. In one embodiment, the degasifier unit is a commercially available unit employing a hydrophobic hollow fiber membrane technology.

Figure 1:
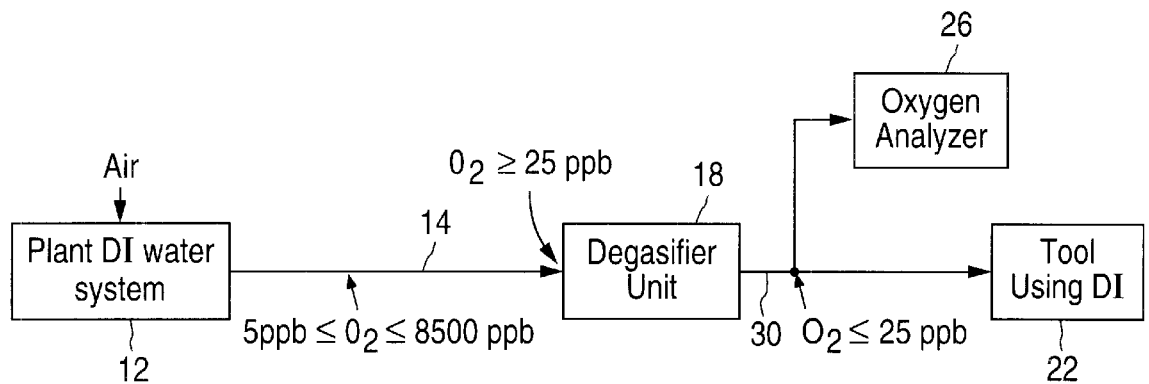
FIG. 1 shows a block diagram of a degasification system in accordance with the present invention.

FIG. 1 shows a block diagram of a degasification system 12 in accordance with the present invention. The plant DI water supply is provided from a prior art system of a well known type which takes ordinary "tap" water and deionizes it and also provides the above described prior art processing where needed, i.e. removal of dissolved ions, particles, and bacteria as needed. This plant deionized water system 12 also, in order to remove the undesirable dissolved carbon dioxide, injects a high level of air into the deionized water thus removing the carbon dioxide but leaving a high level of dissolved oxygen gas at a level of e.g. 8,500 ppb. The plant DI water is then carried fairly long distances through piping system 14 to various points in the plant where is to be used.

In accordance with the invention, prior to use and preferably as physically near the point of use as possible, a degasifier unit 18 is provided. The degasifier unit 18 may be installed as a part of the plant DI water system 12 or may be physically located on a particular semiconductor fabrication tool 22 (equipment); the exact location is not critical. It is to be understood that if a degasifier unit is installed as a part of the plant DI water system 12, the oxygen gas level at the connection to the plant DI supply lines 14 will be fairly low. However, in this case the DI water in the supply lines 14 is likely to be contaminated by additional dissolved oxygen gas acquired in its passage through the supply lines. Thus even in this case, further degasification by degasifier unit 18 at the point of use in accordance with the invention is beneficial.

The degasifier unit 18 substantially reduces the level of dissolved oxygen to e.g. 100 ppb and as low as 25 ppb (or lower). Other levels of oxygen may be maintained depending on the particular process needs. In general, of course, the less oxygen gas the more desirable for semiconductor fabrication. A conventional oxygen analyzer 26 is connected to the DI water line 30 which is the outlet from the degasifier unit 18, to measure actual oxygen gas levels and to verify the operation of the degasifier unit 18. However, this oxygen analyzer 26 is not necessary in accordance with the invention. The degasified (low oxygen gas level) DI water is then provided via line 30 to the particular tool 22 of the type described above.

The degasifier unit 18 itself may be any one of the number of types of well known systems for reducing levels of oxygen gas (or of all dissolved gases). One commercially available unit is the "Liqui-Cel®" membrane contactor supplied by Hoechst Celanese. This unit consists of a bundle of microporous hollow fiber membranes. The deionized water flows around and over the hollow fibers and the undesirable oxygen is extracted into the hollow fibers through the membrane walls of the fibers. Such a contactor transfers gas to or from the aqueous stream. Of course, in accordance with the invention, the contactor operates to transfer the oxygen gas from the aqueous stream. Thus this is well adapted for deaeration or degasifying of process water. In this case, a vacuum or stripping gas (e.g., nitrogen at a low flow rate) is used to remove the dissolved oxygen gas from the water.

To achieve maximum degasification of the water, two (or more) such contactors are connected in series thereby providing for instance a level as low as 20 ppb of oxygen in the processed DI water. Use of these contactors is well known and described in product literature provided by the manufacturer. See the Hoechst-Celanese operating manual copyright 1993, part no. PC-M28-10/93-HC70 which includes a description of the tubing and fittings to be used in conjunction with the contactor and incorporated herein by reference. Actual connection of such a degasifying unit hence is well within the skill of one of ordinary skill in the art and is not described further herein.

A theoretical analysis, not essential to the present invention, using chemical thermodynamic consideration indicates that the presence of oxygen gas in contact with aluminum causes undesirably an electro-chemical reaction, resulting in the undesirable etching or pitting of the aluminum. If copper is a constituent of the aluminum alloy, then aluminum-copper precipitates form at the grain boundaries, creating so-called cathodic points where the native aluminum oxide is weak. Such cathodic points and the surrounding copper depleted alloy will likely have more complex electrochemical reactions involved, but oxygen gas is still believed to play a role in the reactions. Hence, from a theoretical standpoint, reduction of oxygen gas concentration in the DI water reduces the electro-chemical reactions which lead to the undesirable aluminum pitting and etching.

Figure 2A:
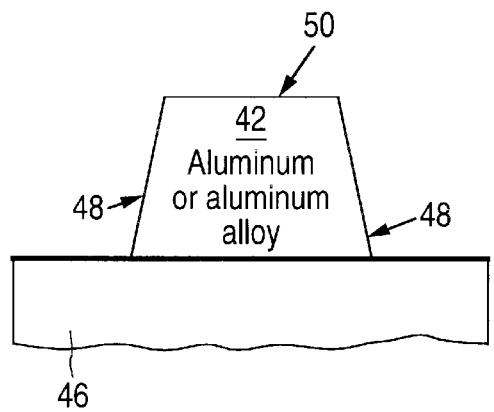
FIGS. 2A and 2B show where undesirable etching or pitting occurs on a semiconductor wafer in the prior art and is prevented in accordance with the invention.
Figure 2B:
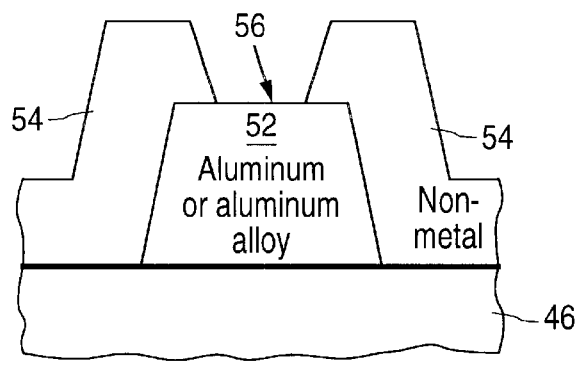

An example of where such pitting or etching occurs is shown in FIGS. 2A and 2B. In FIG. 2A, a cross section through a patterned metal feature 42 is shown on a silicon substrate 46. The aluminum or aluminum alloy feature 42 has sidewalls 48 and a top surface 50 which are exposed and both subject to the pitting and etching.

In FIG. 2B another aluminum or alloy feature 52 is shown in this case largely covered by non-metal materials 54 and only top surface 56 of the feature is exposed. However,,this surface 56 is also subject to the pitting or etching when exposed to DI water. Thus FIGS. 2A and 2B illustrate the portions of a semiconductor wafer during fabrication that are subject to problematic degradation due to DI water in the prior art and which is overcome in accordance with the invention by the degasification process and apparatus.

This disclosure is illustrative but not limiting; further modifications will be apparent to one skilled in the art in the light of this disclosure and are intended to fall within the scope of the appended claims.

I claim:

1. A method of processing semiconductor wafers having an exposed metal layer including aluminum formed thereon, comprising the steps of:

prior to use of water for processing of the semiconductor wafers, injecting air into the water, thereby to remove carbon dioxide from the water;

passing the water with the injected air through a degasifier unit, thereby reducing a concentration of oxygen gas that was dissolved in the water due to the step of injecting air; and rinsing the semiconductor wafers having the exposed metal layer with the degasified water, thereby reducing any etching or pitting of the exposed metal layer by oxygen gas in the water.

2. The method of claim 1, wherein the degasified water has a concentration of dissolved oxygen gas of less than 100 ppb.

3. The method of claim 2, further comprising the step of passing the degasified water through at least one additional degasified unit, wherein the degasified water has a resulting concentration of dissolved oxygen gas of less than 25 ppb.

4. The method of claim 1, wherein the water with the injected air, prior to the step of passing through the degasifier unit, has a concentration of dissolved oxygen gas exceeding 3,000 ppb.

5. The method of claim 1, wherein the degasifier unit is a membrane contactor.

6. The method of claim 1, wherein only a top surface of the metal layer is exposed.

* * * * *